(12) United States Patent
Song et al.

(10) Patent No.: US 12,347,218 B2
(45) Date of Patent: Jul. 1, 2025

(54) SALIENCE-AWARE CROSS-ATTENTION FOR ABSTRACTIVE SUMMARIZATION

(71) Applicant: TENCENT AMERICA LLC, Palo Alto, CA (US)

(72) Inventors: Kaiqiang Song, Bellevue, WA (US); Fei Wang, Palo Alto, CA (US); Xiaoyang Wang, Palo Alto, CA (US); Sangwoo Cho, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 252 days.

(21) Appl. No.: 18/078,155

(22) Filed: Dec. 9, 2022

(65) Prior Publication Data

US 2024/0193973 A1  Jun. 13, 2024

(51) Int. Cl.
| | |
|---|---|
| *G06V 30/18* | (2022.01) |
| *G06F 40/284* | (2020.01) |
| *G06V 30/164* | (2022.01) |
| *G06V 30/19* | (2022.01) |
| *G06V 30/262* | (2022.01) |

(52) U.S. Cl.
CPC ...... *G06V 30/18152* (2022.01); *G06F 40/284* (2020.01); *G06V 30/164* (2022.01); *G06V 30/19093* (2022.01); *G06V 30/274* (2022.01)

(58) Field of Classification Search
CPC ........... G06V 30/18152; G06V 30/164; G06V 30/19093; G06V 30/274; G06F 40/284; G06F 40/30
See application file for complete search history.

(56) References Cited

U.S. PATENT DOCUMENTS

| | | | |
|---|---|---|---|
| 2019/0278835 A1 | 9/2019 | Cohan et al. | |
| 2019/0287012 A1 | 9/2019 | Celikyilmaz et al. | |
| 2019/0362020 A1 | 11/2019 | Paulus et al. | |
| 2020/0110801 A1* | 4/2020 | Zheng | G06N 3/045 |
| 2020/0142917 A1 | 5/2020 | Paulus | |
| 2021/0342377 A1 | 11/2021 | Galle et al. | |

(Continued)

OTHER PUBLICATIONS

International Search Report issued Jun. 16, 2023 in Application No. PCT/US2023/015300.

(Continued)

*Primary Examiner* — Stella L. Woo
(74) *Attorney, Agent, or Firm* — Sughrue Mion, PLLC

(57) ABSTRACT

A method including: receiving an input comprising natural language texts at an encoder; adding a token to the input; obtaining a last-layer hidden state as a natural language text representation; feeding the natural language text representation into a single-layer classification head; predicting a salience allocation based on the single-layer classification head; developing a salience-aware cross-attention (SACA) decoder to determine salience in the natural language text representation; mapping a plurality of salience degrees to a plurality of trainable salience embeddings; estimating an amount of signal to accept from the plurality of trainable salience embeddings; incorporating the salience allocation and the signal in a cross-attention layer model; and generating a summarization based on the SACA decoder and the cross-attention layer model.

20 Claims, 7 Drawing Sheets

(56) References Cited

U.S. PATENT DOCUMENTS

2022/0261545 A1\* 8/2022 Lauber ................ G06F 40/216

OTHER PUBLICATIONS

Written Opinion issued Jun. 16, 2023 in Application No. PCT/US2023/015300.
Fei Wang, et al., "Salience Allocation as Guidance for Abstractive Summarization", arXiv:2210.12330v1, https://arxiv.org/pdf/2210.12330.pdf, Oct. 22, 2022 (13 pages).

\* cited by examiner

FIG. 4A

| Systems | R-1 | R-2 | R-L |
|---|---|---|---|
| *CNN/DM* | | | |
| LEAD-3 | 40.34 | 17.70 | 36.57 |
| Matchsum | 44.41 | 20.86 | 40.55 |
| BARTSum | 44.68 | 21.30 | 40.75 |
| Point-Generator | 39.53 | 17.28 | 36.38 |
| BART | 44.16 | 21.28 | 40.90 |
| PEGASUS | 44.17 | 21.47 | 41.11 |
| CIT + SE | 45.80 | 22.53 | 42.48 |
| Glam | 45.80 | 22.56 | 42.48 |
| BART* | 44.23 | 21.23 | 41.17 |
| SEASON | 46.27 | 22.64 | 43.09 |
| *Newsroom* | | | |
| LEAD-3 | 30.49 | 21.27 | 28.42 |
| Point-Generator | 26.02 | 13.25 | 22.43 |
| PEGASUS | 43.13 | 33.51 | 41.33 |
| BART* | 43.39 | 33.08 | 41.09 |
| SEASON | 46.00 | 33.97 | 43.03 |

Results on CNN/DM and Newsroom test sets. Best scores are in bold. Scores significantly better than the best baseline model are underlined ($p < 0.001$). Results with * are reproduced by us. Other numbers are from prior papers.

FIG. 4C

|  | Informativeness | Faithfulness | Fluency |
|---|---|---|---|
| BART | 87.23 | 70.77 | 85.86 |
| GSum | 78.85 | 79.40 | 20.444* |
| SEASON | 88.889 | 78.11 | 87.888 |
| Ground-Truth | 77.78 | 75.76 | 72.39 |

Percentage of positive votes ('Yes') on informativeness, faithfulness and fluency of summaries. *GSum predictions provided by the authors are lower-cased and lemmatized, which hinders the fluency.

|  | 1st | 2nd | 3rd | 4th | avg. |
|---|---|---|---|---|---|
| BART | 34.68 | 30.64 | 21.21 | 13.47 | 2.13 |
| GSum | 11.11 | 15.49 | 24.02 | 48.48 | 3.11 |
| SEASON | 35.802 | 29.63 | 23.23 | 11.11 | 2.11 |
| Ground-Truth | 19.19 | 24.24 | 29.63 | 26.98 | 2.64 |

Percentage of rankings and the average rank by human evaluation.

SALIENCE-AWARE CROSS-ATTENTION FOR ABSTRACTIVE SUMMARIZATION

TECHNICAL FIELD

The present disclosure provides a method for abstractive summarization guided with salience allocation expectation.

BACKGROUND

Salience may refer to a degree to which a sentence contributes to the central idea of a document. Abstractive summarization models may learn to capture the salient information from scratch implicitly.

Abstractive summarization models may be trained end-to-end using large collections of paired corpora of raw documents and human-written summaries to directly perform sequence-to-sequence generation. In terms of deciding what to include in the generated summaries, these models implicitly learn to capture the salient information from scratch. Accordingly, recent literature has attempted to add auxiliary extractive salience guidance for abstractive summarization models to give them a higher-level understanding of input documents, among which, extractive summaries appear to provide the most effective guidance. Methods following this strategy learn to first perform extractive summarization, then perform abstraction on top of the extractive summaries. However, incorporating extractive summaries as a form of guidance is evidently imperfect, even though it improves the overall performance of abstractive summarization in some cases.

Extractive summaries are not reliable guidance. When there are too many summary-worthy sentences in the document, selecting a part of them may prone to information loss. When there are too few or no summary-worthy sentences, using the selected extractive summaries could be noisy and confusing to the model. Extractive summaries are not flexible to adapt to different cases. The number and allocation of salience content pieces can vary by documents. Rather than extracting a fixed number of sentences, a flexible guidance should select salient content based on document properties. An imperfect selection process may also lead to further model biases, such as positional biases or length biases. As the summarization process can differ for distinct documents a reliable guidance should allow flexible content selection, and be adaptive to documents with different abstractiveness.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for abstractive summarization guided with salience allocation expectation.

According to some embodiments, there is provided a method performed by at least one processor. The method includes receiving an input comprising natural language texts at an encoder. The method further includes adding a token to the input. The method further includes obtaining a last-layer hidden state as a natural language text representation. The method further includes feeding the natural language text representation into a single-layer classification head. The method further includes predicting a salience allocation based on the single-layer classification head. The method further includes developing a salience-aware cross-attention (SACA) decoder to determine salience in the natural language text representation. The method further includes mapping a plurality of salience degrees to a plurality of trainable salience embeddings. The method further includes estimating an amount of signal to accept from the plurality of trainable salience embeddings. The method further includes incorporating the salience allocation and the signal in a cross-attention layer model. The method further includes generating a summarization based on the SACA decoder and the cross-attention layer model.

According to some embodiments, an apparatus includes at least one memory configured to store program code and at least one processor configured to read the program code and operate as instructed by the program code. The program code includes receiving code configured to cause the at least one processor to receive an input comprising natural language texts at an encoder. The program code further includes adding code configured to cause the at least one processor to add a token to the input. The program code further includes obtaining code configured to cause the at least one processor to obtain a last-layer hidden state as a natural language text representation. The program code further includes feeding code configured to cause the at least one processor to feed the natural language text representation into a single-layer classification head. The program code further includes predicting code configured to cause the at least one processor to predict a salience allocation based on the single-layer classification head. The program code further includes developing code configured to cause the at least one processor to develop a salience-aware cross-attention (SACA) decoder to determine salience in the natural language text representation. The program code further includes mapping code configured to cause the at least one processor to map a plurality of salience degrees to a plurality of trainable salience embeddings. The program code further includes estimating code configured to cause the at least one processor to estimate an amount of signal to accept from the plurality of trainable salience embeddings. The program code further includes incorporating code configured to cause the at least one processor to incorporate the salience allocation and the signal in a cross-attention layer model. The program code further includes generating code configured to cause the at least one processor to generate a summarization based on the SACA decoder and the cross-attention layer model.

According to some embodiments, a non-transitory computer-readable storage medium, stores instructions that, when executed by at least one processor, cause the at least one processor to receive an input comprising natural language texts at an encoder. The instructions further cause the at least one processor to add a token to the input. The instructions further cause the at least one processor to obtain a last-layer hidden state as a natural language text representation. The instructions further cause the at least one processor to feed the natural language text representation into a single-layer classification head. The instructions further cause the at least one processor to predict a salience allocation based on the single-layer classification head. The instructions further cause the at least one processor to develop a salience-aware cross-attention (SACA) decoder to determine salience in the natural language text representation. The instructions further cause the at least one processor to map a plurality of salience degrees to a plurality of trainable salience embeddings. The instructions further cause the at least one processor to estimate an amount of signal to accept from the plurality of trainable salience embeddings. The instructions further cause the at least one processor to incorporate the salience allocation and the signal in a cross-attention layer model. The instructions further cause the at least one processor to generate a summarization based on the SACA decoder and the cross-attention layer model.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which:

FIG. 4A is a table presenting data on the performance of the summarization model, according to some embodiments.

FIG. 4C is a table presenting to data on the performance of the summarization model, according to some embodiments.

DETAILED DESCRIPTION

Figure 1:
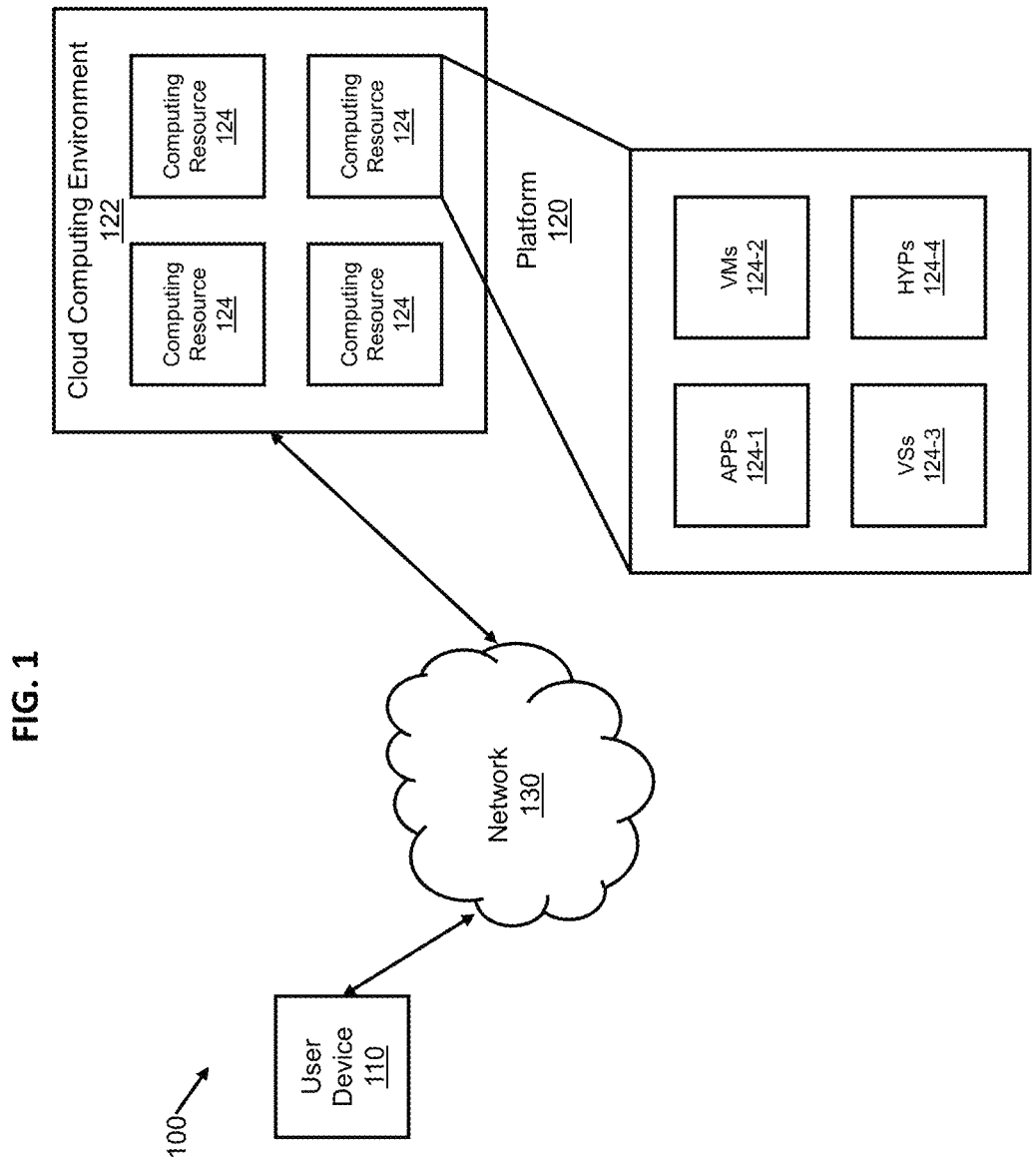
FIG. 1 is a diagram of an environment in which methods, apparatuses and systems described herein may be implemented, according to some embodiments.

The following detailed description of example embodiments refers to the accompanying drawings. The same reference numbers in different drawings may identify the same or similar elements.

The following disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Abstractive summarization models may learn to capture the salient information from scratch implicitly. Recent literature adds extractive summaries as guidance for abstractive summarization models to provide hints of salient content and achieves better performance. However, extractive summaries as guidance could be over strict, leading to information loss or noisy signals. Furthermore, it cannot easily adapt to documents with various abstractiveness. As the number and allocation of salience content pieces vary, it is hard to find a fixed threshold deciding which content should be included in the guidance.

Figure 3:
FIG. 3 is an example of a natural language text summarized using salience allocation, according to some embodiments.

The present disclosure discloses a novel summarization approach with a flexible and reliable salience guidance, namely SEASON (SaliencE Allocation as Guidance for Abstractive SummarizatiON). SEASON utilizes the allocation of salience expectation to guide abstractive summarization and adapts well to articles in different abstractiveness. Automatic and human evaluations on two benchmark datasets show that the proposed method is effective and reliable. In SEASON, the salience guidance is adaptive to documents with different abstractiveness, and the salience-aware cross-attention module is flexible to decide how much signal to accept from the salience guidance. This method provides flexible guidance, thus achieves higher performance for both human and automatic evaluation performance on abstractive summarization. FIG. 3 is an example of natural language text 300 to be summarized using salience allocation.

In some embodiments, to predict salience degrees of input sentences, the encoder input sequence is modified by adding a special token at the beginning of each sentence. The last-layer hidden states are obtained as the sentence representations:

$$[h_1^{sent}, \ldots, h_n^{sent}] = \text{Encoder}(\hat{x}) \quad (1)$$

where $h_1^{sent}, \ldots, h_n^{sent}$ is the contextualized embedding of the $1^{st}$-$n^{th}$ sentence, and $(\hat{x})$ is the modified input sequence. Then, sentence representations are fed into a single-layer classification head:

$$P(z_j = l \mid x) \propto \exp\left(\frac{w_l^T h_2^{sent} + b_u}{\tau}\right) \quad (2)$$

where τ is a sharpening coefficient for the salience degree distribution. The sentence representation also includes an index of salience degree, the number of salience degrees, and trainable parameters.

In some embodiments, to explicitly incorporate the salience allocation into the model, a salience-aware cross-attention (SACA) module is developed. SACA first maps the salience degrees to trainable salience embeddings:

$$f(z_j) = Emb(z_j) \quad (3)$$

This operation is intuitive when using ground-truth salience degrees. For predicted salience degrees, SACA needs to perform an estimation on the salience embedding with the inferred salience distribution. A simple estimation may be achieved by directly taking the embedding of the degree that maximizes the probability:

$$f(z_j) = \text{Emb}\left(\underset{l}{\text{argmax}}\ P(z_j = l \mid x)\right). \quad (4)$$

However, this direct estimation does not take the uncertainty of prediction into consideration, so in some embodiments the estimation that calculates the expectation for the salience embedding is:

$$f(z_j) = \sum_{l=1}^{L} \text{Emb}(z_j = l) P(z_j = l \mid x) \quad (5)$$

Next, SACA incorporates the salience allocation in the cross-attention layer to guide summary generation on the decoder side. SACA adds the sentence salience embedding to the encoder hidden state of each token belonging to the sentence as the key state for cross-attention. The cross-attention is formulated as:

$$\text{CrossAttn}(Q, K, V) = \text{MultiheadAttn}(Q, K, V) \quad (6)$$

where the attention query Q thereof corresponds to the hidden state of the decoder, the attention key K is the sum of the encoder hidden state and the salience embedding, and the value V is composed of the original encoder hidden state. In comparison with adding salience scores to cross-attention scores directly, SACA allows the model to learn how much signal to take from the salience guidance.

In training, SEASON learns to predict the salience allocation and generate the summary simultaneously. For salience prediction, in some embodiments the averaged cross-entropy loss on each predicted sentence is used:

$$\mathcal{L}_{cls} = -\frac{1}{N} \sum_{j=1}^{N} \log P(z_j \mid x) \quad (7)$$

In addition, in some embodiments label smoothing is applied to the salience degrees for denoising. A probability is evenly assigned to salience degrees adjacent to the ground-truth degree. For summary generation, in some embodiments the ground-truth salience allocation is used as an input, and the averaged cross-entropy loss on each predicted token is applied as below:

$$\mathcal{L}_{cls} = -\frac{1}{|y|} \sum_{k=1}^{|y|} \log p_\theta(y_k \mid y < k, x, \zeta(x)) \quad (8)$$

In some embodiments two loss functions are combined together with a coefficient α that balances the two:

$$L_{total} = L_{lm} + \alpha L_{cls} \quad (9)$$

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
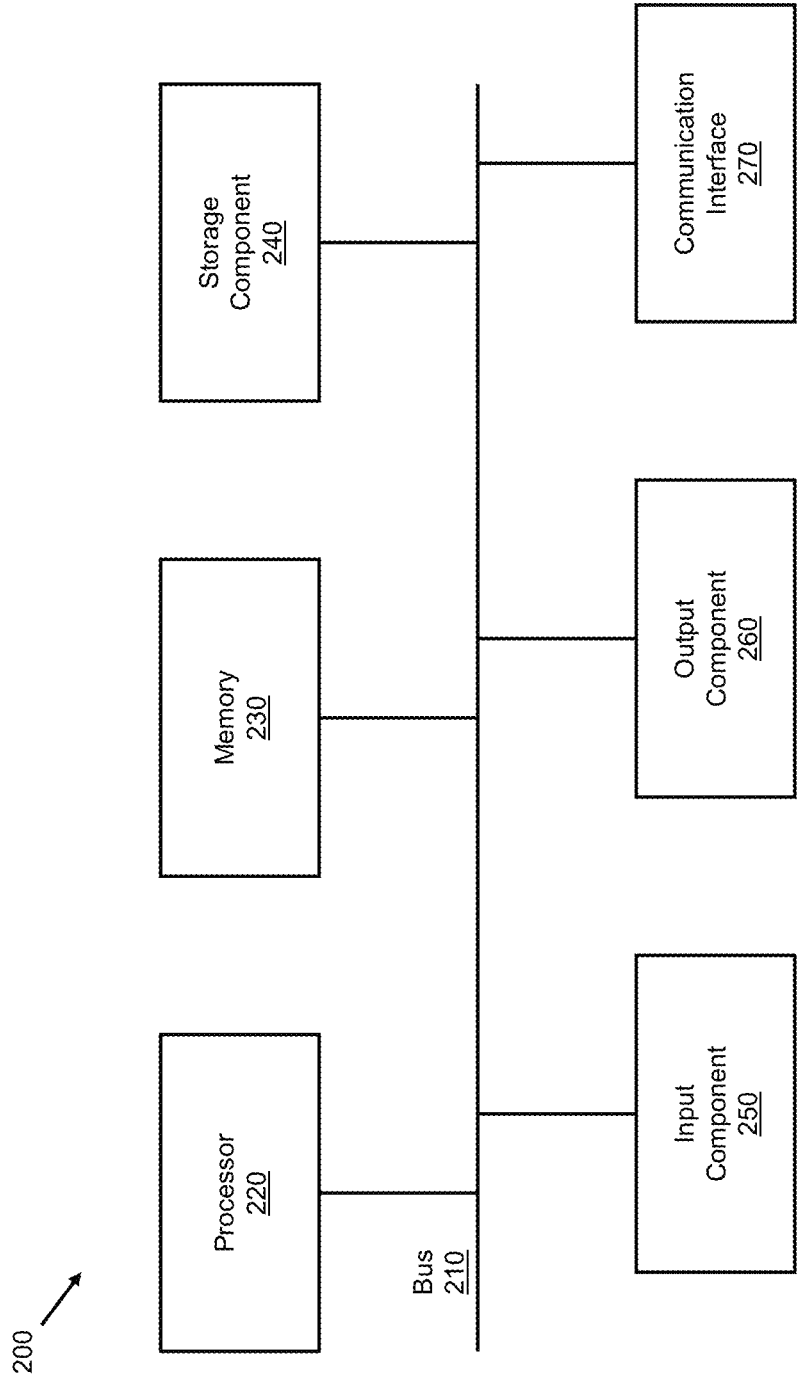
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 4B:
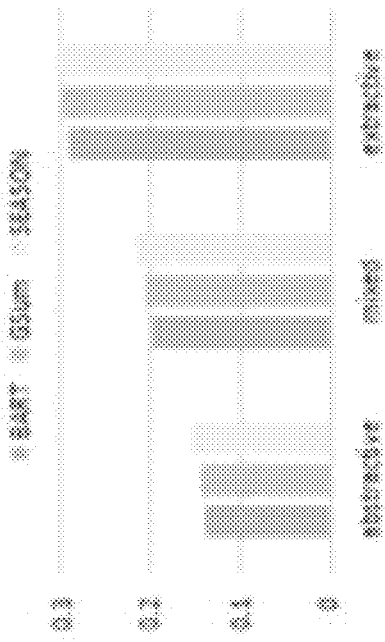
FIG. 4B is a chart presenting the R-2 scores of the summarization model according to some embodiments.

FIG. 4A is a table for better automatic evaluation on 2 benchmark datasets. The table presents results on CNNDM and Newsroom test sets. FIG. 4B is a bar chart showing the improvement on different splits of data (different abstractiveness). FIG. 4C provides a table for better human evaluation results on informativeness, fluency, and a table for overall ranking.

Figure 5:
FIG. 5 is a flow chart of an example process for language representation learning using logical inductive bias, according to some embodiments.

FIG. 5 is a flowchart of example process 500 for abstractive summarization guided with salience allocation expectation. In some implementations, one or more process blocks of FIG. 5 may be performed by any of the elements discussed above.

As shown in FIG. 5, process 500 include receiving input comprising natural language texts at an encoder (block 510).

As further shown in FIG. 5, the process 500 may include adding a token to the input (block 520).

As further shown in FIG. 5, the process 500 may include obtaining a last-layer hidden state as a natural language text representation (block 530).

As further shown in FIG. 5, the process 500 may include feeding the natural language text representation into a single-layer classification head (block 540).

As further shown in FIG. 5, the process 500 may include predicting a salience allocation based on the single-layer classification head (block 550).

As further shown in FIG. 5, the process 500 may include developing a salience-aware cross-attention (SACA) decoder to determine salience in the natural language text representation (block 560).

As further shown in FIG. 5, the process 500 may include mapping a plurality of salience degrees to a plurality of trainable salience embeddings (block 570).

As further shown in FIG. 5, the process 500 may include estimating an amount of signal to accept from the plurality of salience embeddings (block 580).

As further shown in FIG. 5, the process 500 may include incorporating the salience allocation and the salience embeddings signal in a cross-attention layer model (block 590).

As further shown in FIG. 5, the process 500 may include generating a summarization based on the SACA decoder and the cross-attention layer model (block 599).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method executed by at least one processor, the method comprising:
    receiving an input comprising natural language texts at an encoder;
    adding a token to the input;
    obtaining a last-layer hidden state as a natural language text representation;
    feeding the natural language text representation into a single-layer classification head;
    predicting a salience allocation based on the single-layer classification head;
    developing a salience-aware cross-attention (SACA) decoder to determine salience in the natural language text representation;
    mapping a plurality of salience degrees to a plurality of trainable salience embeddings;
    estimating an amount of signal to accept from the plurality of trainable salience embeddings;
    incorporating the salience allocation and the signal in a cross-attention layer model; and
    generating a summarization based on the SACA decoder and the cross-attention layer model.

2. The method according to claim 1, wherein the natural language text representation comprises a contextualized embedding of the natural language texts and a modified input sequence of the natural language texts.

3. The method according to claim 1, further comprising assigning a ground-truth salience label to the natural language texts based on a similarity between the natural language texts and a ground-truth summary.

4. The method according to claim 1, wherein estimating the amount of the signal to accept from the plurality of trainable salience embeddings comprises identifying a salience embedding of a salience degree that maximizes a probability.

5. The method according to claim 1, wherein the plurality of salience degrees have a corresponding plurality of cut-off thresholds that are based on a corpus to balance informativeness and prediction accuracy.

6. The method according to claim 1, wherein predicting the salience allocation and generating the summarization occurs simultaneously.

7. The method according to claim 1, wherein predicting the salience allocation further comprises:
averaging a cross-entropy loss in each natural language text of the natural language texts;
applying label smoothing to the plurality of salience degrees for denoising; and
assigning a probability to the plurality of salience degrees adjacent to a ground-truth.

8. An apparatus comprising:
at least one memory configured to store program code; and
at least one processor configured to read the program code and operate as instructed by the program code, the program code comprising:
receiving code configured to cause the at least one processor to receive an input comprising natural language texts at an encoder;
adding code configured to cause the at least one processor to add a token to the input;
obtaining code configured to cause the at least one processor to obtain a last-layer hidden state as a natural language text representation;
feeding code configured to cause the at least one processor to feed the natural language text representation into a single-layer classification head;
predicting code configured to cause the at least one processor to predict a salience allocation based on the single-layer classification head;
developing code configured to cause the at least one processor to develop a salience-aware cross-attention (SACA) decoder to determine salience in the natural language text representation;
mapping code configured to cause the at least one processor to map a plurality of salience degrees to a plurality of trainable salience embeddings;
estimating code configured to cause the at least one processor to estimate an amount of signal to accept from the plurality of trainable salience embeddings;
incorporating code configured to cause the at least one processor to incorporate the salience allocation and the signal in a cross-attention layer model; and
generating code configured to cause the at least one processor to generate a summarization based on the SACA decoder and the cross-attention layer model.

9. The apparatus according to claim 8, wherein the natural language text representation comprises a contextualized embedding of the natural language texts and a modified input sequence of the natural language texts.

10. The apparatus according to claim 8, wherein the program code further comprises assigning code configured to cause the at least one processor to assign a ground-truth salience label to the natural language texts based on a similarity between the natural language texts and a ground-truth summary.

11. The apparatus according to claim 8, wherein the estimating code further causes the at least one processor to identify a salience embedding of a salience degree that maximizes a probability.

12. The apparatus according to claim 8, wherein the plurality of salience degrees have a corresponding plurality of cut-off thresholds that are based on a corpus to balance informativeness and prediction accuracy.

13. The apparatus according to claim 8, wherein predicting the salience allocation and generating the summarization occurs simultaneously.

14. The apparatus according to claim 8, wherein the predicting code further causes the at least one processor to:
average a cross-entropy loss in each natural language text of the natural language texts;
apply label smoothing to the plurality of salience degrees for denoising; and
assign a probability to the plurality of salience degrees adjacent to a ground-truth.

15. A non-transitory computer-readable storage medium, storing instructions, which, when executed by at least one processor, cause the at least one processor to:
receive an input comprising natural language texts at an encoder;
add a token to the input;
obtain a last-layer hidden state as a natural language text representation;
feed the natural language text representation into a single-layer classification head;
predict a salience allocation based on the single-layer classification head;
develop a salience-aware cross-attention (SACA) decoder to determine salience in the natural language text representation;
map a plurality of salience degrees to a plurality of trainable salience embeddings;
estimate an amount of signal to accept from the plurality of trainable salience embeddings;
incorporate the salience allocation and the signal in a cross-attention layer model; and
generate a summarization based on the SACA decoder and the cross-attention layer model.

16. The non-transitory computer-readable storage medium according to claim 15, wherein the natural language text representation comprises a contextualized embedding of the natural language texts and a modified input sequence of the natural language texts.

17. The non-transitory computer-readable storage medium according to claim 15, wherein the instructions further cause the at least one processor to assign a ground-truth salience label to the natural language texts based on a similarity between the natural language texts and a ground-truth summary.

18. The non-transitory computer-readable storage medium according to claim 15, wherein the instructions that cause the at least one processor to estimate the amount of the signal to accept from the plurality of trainable salience embeddings further causes the at least one processor to identify a salience embedding of a salience degree that maximizes a probability.

19. The non-transitory computer-readable storage medium according to claim 15, wherein the plurality of salience degrees have a corresponding plurality of cut-off thresholds that are based on a corpus to balance informativeness and prediction accuracy.

20. The non-transitory computer-readable storage medium according to claim 15, wherein predicting the salience allocation and generating the summarization occurs simultaneously.

* * * * *